United States Patent [19]

Kimura et al.

[11] Patent Number: 4,495,608

[45] Date of Patent: Jan. 22, 1985

[54] DEVICE FOR RAPIDLY MOVING AN OPTICAL PICK-UP DEVICE IN AN OPTICAL REPRODUCING APPARATUS TO A DESIRED POSITION ON A RECORD DISC

[75] Inventors: Shuichi Kimura, Saitama; Akira Katsuyama, Kanagawa, both of Japan

[73] Assignee: Sony Corporation, Tokyo, Japan

[21] Appl. No.: 458,553

[22] Filed: Jan. 17, 1983

[30] Foreign Application Priority Data

Jan. 16, 1982 [JP] Japan .................................. 57-5265

[51] Int. Cl.³ ........................ G11B 7/00; G11B 17/00; G11B 21/10
[52] U.S. Cl. ....................................... 369/33; 369/41; 369/98; 369/215
[58] Field of Search ................... 369/33, 41, 215, 219, 369/221, 223, 224, 98

[56] References Cited

U.S. PATENT DOCUMENTS

| | | | |
|---|---|---|---|
| 4,106,058 | 8/1978 | Romeas et al. | 369/33 |
| 4,138,663 | 2/1979 | Lehureau et al. | 369/33 |
| 4,330,879 | 5/1982 | Wine | 369/33 |

Primary Examiner—Steven L. Stephan
Attorney, Agent, or Firm—Lewis H. Eslinger; Alvin Sinderbrand

[57] ABSTRACT

A device for rapidly moving an optical pick-up device in an optical reproducing apparatus to a desired position on a record disc having a plurality of record tracks with an information signal recorded therein, includes a tracking error signal generating circuit for producing a tracking error signal corresponding to deviation of the pick-up device from the center of each record track; a drive device for moving the pick-up device in a direction transverse to the record tracks; and a track jump signal forming circuit for producing a track jump signal comprised of a drive signal followed by a brake signal, in response to the tracking error signal, the drive signal having a duration corresponding to the number of tracks traversed by the pick-up device and the brake signal having a duration corresponding to the speed of movement of the optical pick-up device in traversing the tracks, and for supplying the track jump signal to the drive device to control the latter to rapidly move the optical pick-up device in a direction transverse to the record tracks to the desired position.

11 Claims, 15 Drawing Figures

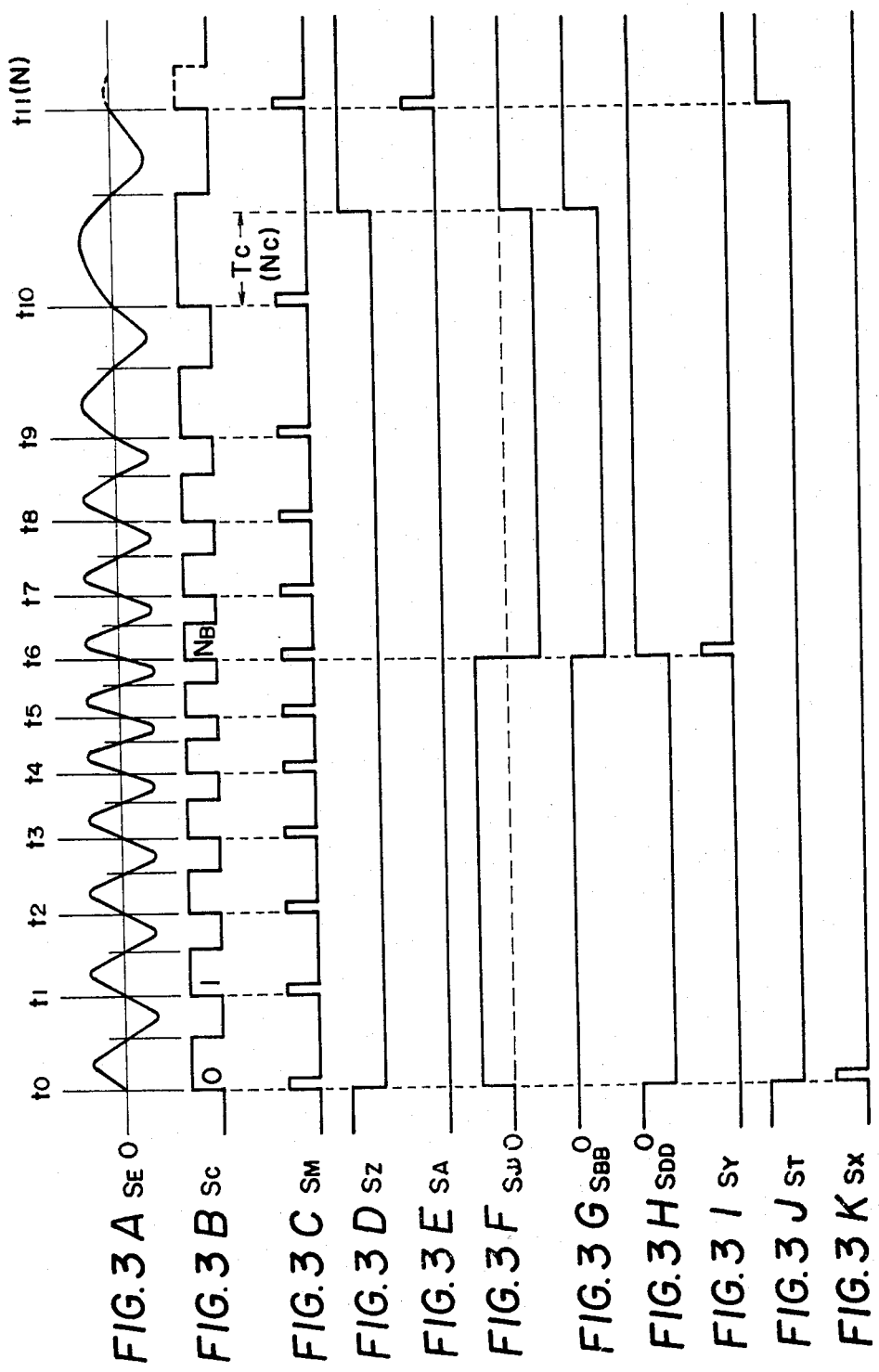

DEVICE FOR RAPIDLY MOVING AN OPTICAL PICK-UP DEVICE IN AN OPTICAL REPRODUCING APPARATUS TO A DESIRED POSITION ON A RECORD DISC

BACKGROUND OF THE INVENTION

This invention relates generally to optical reproducing apparatus and, more particularly, is directed to a device for rapidly moving an optical pick-up device of an optical reproducing apparatus to a desired position on a record disc during a search operation.

Apparatus is known in the art for optically reproducing an information signal from a record disc during rotation of the latter. With such apparatus, an optical pick-up device is positioned below the record disc and projects a laser beam onto the disc. The laser beam is modulated by, for example, audio information recorded on the disc in the form of small pits arranged in a spiral track or in concentric tracks, and the modulated laser beam is reflected from the underside of the disc back to the optical pick-up device which produces an output signal in response to the modulated laser beam and which supplies such signal to further processing circuitry for separating the audio information therefrom.

In one such apparatus, it has been proposed to detect address information also recorded on the record disc for performing a search or track jump operation so that reproduction at a desired position can be easily and quickly achieved. In particular, a selected address corresponding to the desired position is preset, and the pick-up device is rapidly moved across or transverse to the record tracks to the desired position on the record disc corresponding to the selected address.

In a small scale search or track jump operation in which the optical pick-up device is rapidly moved to a selected address which is located only a few tracks away from the track at which the pick-up device is presently located, the pick-up device can repeatedly be moved on a track by track basis. However, in a large scale search or track jump operation in which the selected track is relatively distant from the track at which the pick-up device is presently situated, the repeated track by track operation cannot practically be performed in a short period of time. As a result, one of the distinct advantages of a digital audio disc system, that is, rapid and easy movement of the pick-up device to a desired location, vanishes. Accordingly, for a large scale search operation, it is desirable to rapidly move or jump the pick-up device across a plurality of, for example, 10 or 100, record tracks at a time until the desired location is reached and, for a small scale search operation, to move the pick-up device in the aforementioned track by track movement.

For the large scale search operation, it has been proposed to supply a track jump signal to a drive device to control the latter to rapidly move or jump the device across a plurality of record tracks at a time until the desired location is reached. The track jump signal is comprised of a drive pulse signal which controls the drive device to move the optical pick-up device rapidly across a predetermined number of record tracks, followed by a brake pulse signal for controlling the drive device to brake movement of the optical pick-up device so that the pick-up device is accurately and quickly moved to the desired location. It is to be appreciated that, during the normal reproduction operation, a tracking error signal obtained in response to deviation of the reading position of the optical pick-up device from the center of the record track then being scanned is produced. This tracking error signal is supplied to the drive device which functions as a tracking servo control arrangement for moving the optical pick-up device in a direction transverse to each respective record track to correct for such deviation. However, during the search or track jump operation, the tracking error signal is not supplied to the drive device. Rather, in place thereof, the aforementioned track jump signal is supplied to the drive device, thereby rendering inoperative the tracking servo control operation.

As previously described, the track jump signal includes a drive pulse signal which results in a current of a first polarity flowing through a drive motor of the drive device to move the optical pick-up device rapidly across a predetermined number of record tracks. Thereafter, the brake pulse signal is supplied to the drive motor to cause a current of a second polarity opposite to the first polarity to flow through the drive motor to brake movement of the optical pick-up device to stop the latter at the desired location on the record disc. It is to be appreciated that the duration or period of each of the drive pulse signal and brake pulse signal is predetermined in accordance with the number of record tracks to be jumped over by the optical pick-up device during the search operation.

However, various problems result with such large scale search or track jump operation. In particular, the number of record tracks to be jumped or traversed by the optical pick-up device when a track jump signal is supplied to the drive device may differ depending upon the eccentricity of the disc, mechanical non-uniformity in the tracking control arrangement, temperature conditions and the like. As a result, it is difficult to ensure that the optical pick-up device is rapidly and accurately moved to jump over or traverse the record tracks to a desired location on the disc. In other words, the optical pick-up device may be moved past or overshoot the desired location as a result of an insufficient brake pulse signal or may not be moved completely to the desired location as a result of an excessive braking force caused by the brake pulse signal.

OBJECTS AND SUMMARY OF THE INVENTION

Accordingly, it is an object of this invention to provide a method and device for rapidly moving a pick-up device of an optical reproducing apparatus to a desired position on a record disc that avoids the above-described difficulties encountered with the prior art.

More particularly, it is an object of this invention to provide a method and device for rapidly and accurately moving a pick-up device of an optical reproducing apparatus to a desired position on a record disc.

It is another object of this invention to provide a method and device for rapidly and accurately moving a pick-up device of an optical reproducing apparatus to a desired position on a record disc in response to a tracking error signal obtained from the output of the pick-up device.

In accordance with an aspect of this invention, a device for rapidly moving pick-up means of information signal reproducing apparatus to a desired position with respect to a record disc having at least one record track with an information signal recorded therein, includes tracking error means for producing a tracking error signal corresponding to deviation of the pick-up means with respect to each record track; drive means for moving the pick-up means in a direction transverse to the at least one record track; and track jump means for producing a track jump signal comprised of a drive signal followed by brake signal, in response to the tracking error signal, and for supplying the track jump signal to the drive means to control the latter to rapidly move the pick-up means in a direction transverse to the at least one record track to the desired position.

In accordance with another aspect of this invention, a method of rapidly moving pick-up means of information signal reproducing apparatus to a desired position with respect to a record disc having at least one record track with an information signal recorded therein, includes the steps of producing a tracking error signal corresponding to deviation of the pick-up means with respect to each record track; producing a track jump signal comprised of a drive signal followed by a brake signal, in response to the tracking error signal; and supplying the track jump signal to drive means to control the latter to rapidly move the pick-up means in a direction transverse to the at least one record track to the desired position.

In accordance with still another aspect of this invention, apparatus for reproducing an information signal recorded in at least one record track on a record disc, includes pick-up means for reproducing the information signal from the at least one record track; drive means for moving the pick-up means in a direction transverse to the at least one record track; tracking error means for producing a tracking error signal corresponding to deviation of the pick-up means with respect to each record track; track jump means for producing a track jump signal comprised of a drive signal followed by a brake signal, in response to the tracking error signal, to control the drive means to rapidly move the pick-up means in a direction transverse to the at least one record track to a desired position with respect to the record disc; and switch means for supplying the tracking error signal to the drive means during an information signal reproducing operation to correct for the deviation of the pick-up means with respect to each record track, and for supplying the track jump signal to the drive means during a search operation to control the drive means to rapidly move the pick-up means in a direction transverse to the at least one record track to the desired position.

In accordance with yet another aspect of this invention, a device for rapidly moving pick-up means of information signal reproducing apparatus to a desired position with respect to a record disc having at least one record track with an information signal recorded therein, includes drive means for moving the pick-up means in a direction transverse to the at least one record track; and track jump means for producing a track jump signal comprised of a drive signal having a duration corresponding to a predetermined number of tracks traversed by the pick-up means during movement of the latter in the direction transverse to the at least one record track, followed by a brake signal having a duration corresponding to the speed of movement of the pick-up means in the direction transverse to the at least one record track, and for supplying the track jump signal to the drive means to control the latter to rapidly move the pick-up means in a direction transverse to the at least one record track to the desired position.

The above, and other, objects, features and advantages of the present invention will become readily apparent in the following detailed description thereof which is to be read in connection with the accompanying drawings.

BRIEF DESCRIPTION OF THE DRAWINGS

FIGS. 3A–3K are waveform diagrams used for explaining the operation of the device shown in FIG. 2.

DETAILED DESCRIPTION OF A PREFERRED EMBODIMENT

Figure 1A:
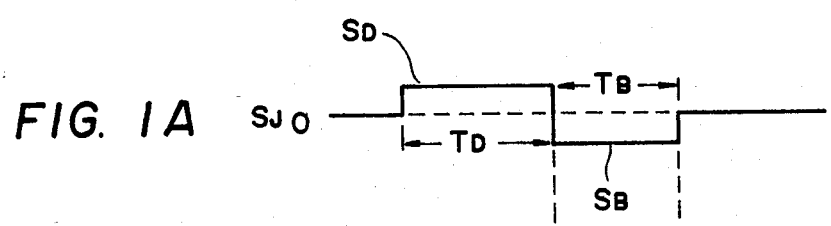
FIGS. 1A–1C are waveform diagrams illustrating the use of a track jump signal in previously proposed optical reproducing apparatus.
Figure 1B:
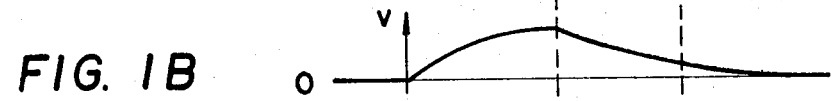
Figure 1C:
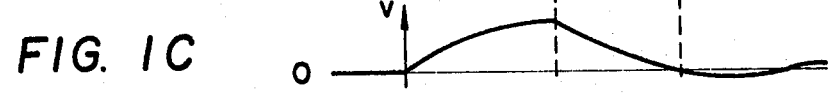

Referring to the drawings in detail, and initially to FIGS. 1A–1C thereof, waveform diagrams which show the use of a track jump signal in a previously proposed optical reproducing apparatus will first be described. In particular, a track jump signal $S_J$ is shown in FIG. 1A to include a drive pulse signal $S_D$ having a period or duration $T_D$, followed by a brake pulse signal $S_B$ having a period or duration $T_B$. Drive pulse signal $S_D$ is supplied to a drive motor of tracking control apparatus for moving an optical pick-up device in a direction transverse to and across a predetermined number of record tracks formed on the disc, which number is less than the number of record tracks which the pick-up device must move to a desired position on the record disc. Drive pulse signal $S_D$ is formed as a rectangular pulse having a first polarity, for example, a positive polarity as shown in FIG. 1A, to control the drive motor to rapidly move the pick-up device across the aforementioned predetermined number of tracks. Brake pulse signal $S_B$, on the other hand, is formed as a rectangular pulse having an opposite polarity, for example, a negative polarity as shown in FIG. 1A, following drive pulse signal $S_D$, to control the drive motor for the pick-up device to apply a reverse or braking force so that the pick-up device stops at the desired position on the record disc.

However, with such arrangement, the optical pick-up device may overshoot, that is, travel past the desired position on the record disc or undershoot, that is, not reach the desired position on the record disc due to an inexact braking force resulting from brake pulse signal $S_B$. In particular, the case where the braking force is insufficient so that the optical pick-up device overshoots the desired location is shown in FIG. 1B. In such case, the speed of movement v of the optical pick-up device across the record tracks increases in response to drive pulse signal $S_D$ during the period $T_D$. Thereafter, the speed of movement v of the optical pick-up device is reduced by brake pulse signal $S_B$. Since the braking force resulting from brake pulse signal $S_B$ is insufficient in this case, the speed of movement v of the optical pick-up device is not sufficiently reduced at the end of the braking period $T_B$ so that the optical pick-up device overshoots the desired position on the record disc. In like manner, for the aforementioned undershoot situation, the braking force resulting from brake pulse signal $S_B$ is excessive so that the optical pick-up device even moves a little in the reverse direction, as indicated in FIG. 1C.

Figure 2:
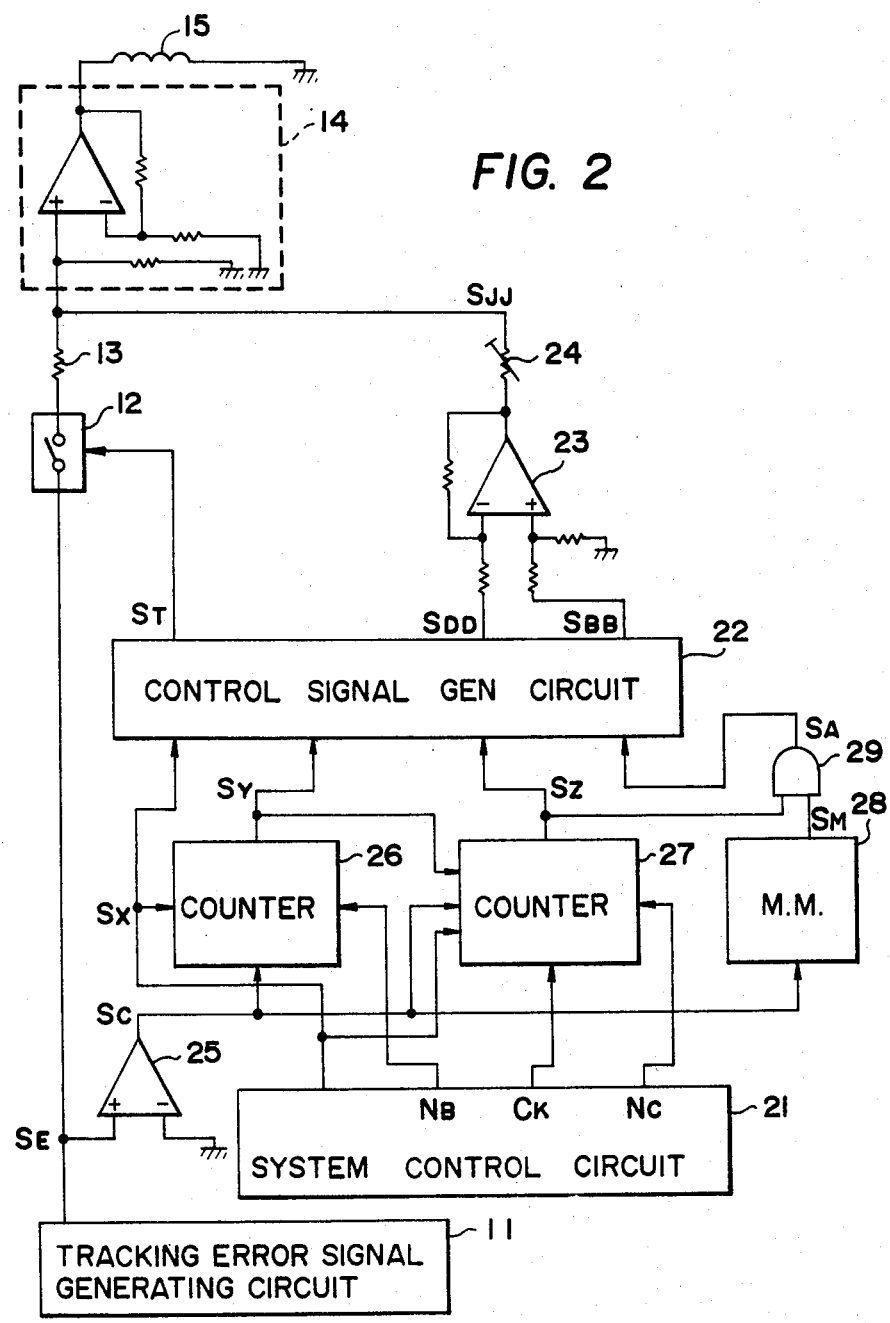
FIG. 2 is a block diagram of a device for performing a track jump operation in an optical reproducing apparatus according to one embodiment of the present invention.

Referring now to FIG. 2, a device for performing a track jump or search operation in an optical reproducing apparatus according to one embodiment of the present invention will now be described. It is to be appreciated that the present invention is designed for use with a rotating record disc having information recorded therein in the form of pits in a plurality of concentric record tracks or a spiral record track. Hereinafter, although a single spiral track literally contains only one track, in the specification and claims, it will be considered to be the equivalent of and contain a plurality of concentric record tracks for a search or track jump operation according to the present invention. An optical pick-up device is provided, for example, below the record disc and is linearly moved in the radial direction of the record disc by a feed mechanism comprised of suitable gearing and a drive motor either from the inner or outer periphery of the record disc in correspondence with rotation thereof. The pick-up device emits a laser light beam onto the record disc where it is modulated by the information recorded thereon in the form of pits and reflected back to a detector for separating the information from the modulated light beam.

In order to ensure that the light beam emitted by the pick-up device is reflected onto the center of each track to obtain an accurate reading, a tracking error signal generating circuit 11 produces a tracking error $S_E$, shown in FIG. 3A, in response to tracking error, that is, deviation of the reading position of the optical pick-up device from the center of each record track on the disc. During a normal reproduction operation, tracking error signal $S_E$ is supplied through a switch 12 and a resistor 13 to a drive circuit 14 which, in turn, supplies a drive signal to a tracking control device 15 which may, for example, be the coil of a drive motor for driving or moving the pick-up device linearly in the radial direction of the disc. In this manner, a tracking servo control operation is performed so that the light beam emitted from the optical pick-up device is accurately reflected onto the center of each track on the disc. As an example, tracking error signal generating circuit 11 may be comprised of a photo-detector for detecting deviation or tracking error of the optical pick-up device from the center of each track in response to, for example, the modulated laser beam reflected from the disc. Tracking error signal generating circuit 11 also includes circuitry for processing the output of the photo-detector and producing the aforementioned tracking signal $S_E$ as a voltage which varies in polarity and absolute value in response the direction and amount of tracking error, respectively. It is to be appreciated that the variable voltage tracking error signal $S_E$ has a zero value when the reading position of the optical-up device is properly centered on the respective record track.

When it is desired to commence a search or track jump operation, a system control circuit 21 produces a command signal $S_X$, as shown in FIG. 3K, which is supplied to a control signal generating circuit 22. During the normal reproduction operation, control signal generating circuit 22 supplies a switch control signal $S_T$, which is at a high or logic "1" level, to switch 12 for controlling the latter to supply tracking error signal $S_E$ through resistor 13 to drive circuit 14 for controlling the drive motor to correct for tracking errors. When it is desired to perform a search or track jump operation, switch control signal $S_T$ is changed from its high level to a low or logic "0" level, as shown in FIG. 3J, to turn OFF switch 12 and thereby prevent tracking error signal $S_E$ from being supplied to drive circuit 14. In other words, at such time, tracking control device 15 is not controlled by tracking error signal $S_E$ such that the tracking servo control operation is rendered inoperative. As a result, and as will hereinafter be described, the reading position of the optical pick-up device can be rapidly moved transversely across the disc.

More particularly, at such time, an operational amplifier 23 having its inverting and non-inverting inputs connected to control signal generating circuit 22, supplies a track jump signal $S_{JJ}$, shown in FIG. 3F, through a variable resistor 24, which is provided for controlling the amplitude of the output of operational amplifier 23, to drive circuit 14 for controlling tracking control device 15 and, more particularly, the drive motor thereof, to drive the optical-pick-up device to a desired location on the record disc. At a time when command $S_X$ is supplied to control signal generating circuit 22, the latter circuit supplies a drive pulse signal $S_{DD}$ shown in FIG. 3H, to the inverting input terminal of operational amplifier 23. At such time, which will hereinafter be referred to as time $t_0$, drive pulse signal $S_{DD}$ is changed from a zero level to a negative level. It is to be appreciated that, since drive pulse signal $S_{DD}$ is supplied to the inverting input of operational amplifier 23, the first part of track jump signal $S_{JJ}$ corresponds to an inversion of drive pulse signal $S_{DD}$ and is thereby changed from a zero level to a positive level, as shown in FIG. 3F. Since track jump signal $S_{JJ}$ is at a positive level during the first portion thereof, a current of a first polarity flows through tracking control device 15 so that the optical pick-up device is moved transversely across the record tracks in a first direction toward the desired position on the record disc.

During such latter movement of the optical pick-up device across the record tracks in response to drive pulse signal $S_{DD}$, that is, in response to the first part of track jump signal $S_{JJ}$, tracking error signal generating signal 11 still produces tracking error signal $S_E$, which varies with movement of the reading position of the optical pick-up device, as shown in FIG. 3A, in which times $t_1$, $t_2$, $t_3$ . . . $t_{11}$ represent times when the reading position of the optical pick-up device is momentarily centered on a respective record track as the optical pick-up device moves transversely across the record tracks. It is to be appreciated from FIG. 3A, that movement of the optical pick-up device across the record tracks in the direction toward the desired position on the record disc, which occurs at time $t_{11}$, accelerates gradually in response to drive pulse signal $S_{DD}$. Tracking error signal $S_E$ generated during the search operation is supplied to the non-inverting input of an operational amplifier 25 which functions as a voltage comparator, the inverting input of which is connected to ground. As a result, a rectangular pulse signal $S_C$, as shown in FIG. 3B, is produced such that a rectangular pulse is formed each time that the reading position of the optical pick-up device traverses one of the record tracks on the disc. It is to be appreciated that each pulse of rectangular pulse signal $S_C$ is pulse-width modulated such that the width thereof corresponds to the speed of movement of the optical pick-up device across the record tracks during the search mode of operation.

Rectangular pulse signal $S_C$ is supplied to one input of a counter 26 as a clock pulse therefor. Counter 26 is also supplied with command signal $S_X$ at a reset input terminal thereof, and with a signal corresponding to a predetermined count $N_B$ which is less than the number $N-1$, where N is the number of tracks to be traversed by the optical pick-up device to bring the latter to the desired position on the record disc. As will be discussed in greater detail hereinafter, the number N−1 corresponds to the track at which the search or track jump operation is terminated and the tracking error operation is resumed. It is to be appreciated that, in the example described with respect to FIGS. 3A–3K, the desired position occurs at time $t_{11}$ after the optical pick-up device has crossed ten tracks, that is, the track jump operation is performed for every 10 tracks. However, any number of tracks can be crossed during each track jump operation, as long as that number is predetermined.

The count $N_B$ is determined by system control circuit 21 is response to the number N−1 and is supplied to a set input of counter 26 for setting the number therein. For example, if it is desired to jump 10 tracks, N−1=10, and if it is desired to jump 100 tracks, N−1=100. The value of count $N_B$ is predetermined, for example, by experiment, depending on the value of N−1 used. The value of N−1 used is determined by system control circuit 21 in response to the desired address to which the optical pick-up device is to be moved, that is, for large distances, N−1 is set to 100 and for smaller distances, N−1 is set to 10. Thus, at the beginning of the track jump operation, command signal $S_X$ resets the count of counter 26 and the count $N_B$ corresponding to the number N−1 used is set in counter 26. At such time, counter 26 begins counting the rectangular pulses of rectangular pulse signal $S_C$, starting at time $t_1$. At a time when this count is equal to the preset count $N_B$, counter 26 supplies a command signal $S_Y$, as shown in FIG. 3I, to control signal generating circuit 22. It is to be appreciated that counter 26 accurately counts the number of tracks corresponding to count $N_B$ since counter 26 counts the rectangular pulses of rectangular pulse signal $S_C$. As an example, and referring to FIGS. 3A–3K, if it is desired to traverse ten record tracks, whereby the desired position corresponds to an eleventh track, N is selected to be eleven, $N_B$ is determined to be six and command signal $S_Y$ is produced by counter 26 at time $t_6$, as shown in FIG. 3I.

In response to command signal $S_Y$ from counter 26, control signal generating circuit 22 terminates drive pulse signal $S_{DD}$, that is, returns drive pulse signal $S_{DD}$ from its negative level to a zero level. Also, at this time, control signal generating circuit 22 supplies a brake pulse signal $S_{BB}$, shown in FIG. 3G, to the non-inverting input of operational amplifier 23. More particularly, brake pulse signal $S_{BB}$ is changed from a zero level to a negative level. In this manner, since brake pulse signal $S_{BB}$ is at a negative level and drive pulse signal $S_{DD}$ is at a zero level, track jump signal $S_{JJ}$ at the output of operational amplifier 23 is changed from a positive level to a negative level, as shown in FIG. 3F. As a result, when track jump signal $S_{JJ}$ is supplied to drive circuit 14, current of an opposite polarity flows through tracking control device 15 in response to that portion of track jump signal $S_{JJ}$ resulting from brake pulse signal $S_{BB}$. In this manner, movement of the optical pick-up device in the direction toward the desired position is braked and is thereby gradually reduced after time $t_6$.

System control circuit 21 also produces clock pulses CK having a period shorter than the minimum interval between two contiguous rectangular pulses from rectangular pulse signal $S_C$ and which are supplied to a clock input of a counter 27. Counter 27 is also supplied with command signals $S_X$ and $S_Y$ and rectangular pulse signal $S_C$, and produces an output signal $S_Z$, shown in FIG. 3D, in response thereto. In particular, during the start of a search or track jump operation at time $t_0$, output signal $S_Z$ changes from a high or logic "1" level to a low or logic "0" level in response to command signal $S_X$. At time $t_6$, counter 27 begins counting the clock pulses $C_K$ contained in the high or logic level "1" portion of each rectangular pulse of rectangular pulse signal $S_C$, in response to command signal $S_Y$. The count of counter 27 is reset to zero by the falling or negative-going edge of each rectangular pulse of rectangular pulse signal $S_C$. It is to be appreciated that the duration of the high level portion of each rectangular pulse of rectangular pulse signal $S_C$ corresponds to the time in which the optical pick-up device moves half of the distance between every two contiguous record tracks on the record disc. It is to be further appreciated that, after time $t_6$, movement of the optical pick-up device across the record tracks is braked so that the speed thereof is gradually reduced. In other words, the duration of each rectangular pulse of rectangular pulse signal $S_C$ is gradually increased. When the duration of a rectangular pulse in rectangular pulse signal $S_C$ exceeds a predetermined duration $T_C$ corresponding to a predetermined number $N_C$ of clock pulses $C_K$ which is preset into counter 27 by system control circuit 21, output signal $S_Z$ of counter 27 changes from its low level back to its high or logic "1" level, as shown in FIG. 3D.

In response to output signal $S_Z$ supplied thereto, control signal generating circuit 22 terminates brake pulse signal $S_{BB}$ supplied to the non-inverting input of operational amplifier 23, that is, changes the level of brake pulse signal $S_{BB}$ from its negative level to a zero level. This means that track jump signal $S_{JJ}$ returns to a zero level at such time. It is to be appreciated that, since the count $N_B$ supplied to counter 26 is determined in accordance with the number N−1 of record tracks which are to be traversed by the optical pick-up device before reaching the desired position on the record disc, and the period $T_C$ determined in accordance with the count $N_C$ is selected to be relatively long so that braking of the optical pick-up device is stopped when the speed of movement thereof is sufficiently reduced, the optical pick-up device reaches the desired track location on the record disc at a sufficiently reduced speed to enable resumption of the tracking control operation.

In this regard, rectangular pulse signal $S_C$ is also supplied to a monostable multivibrator 28 which, in turn, produces a pulse signal $S_M$, as shown in FIG. 3C, comprised of pulses produced in response to the rising or positive-going edge of each rectangular pulse of rectangular pulse signal $S_C$ and with each pulse of pulse signal $S_M$ having a period less than each rectangular pulse of rectangular pulse signal $S_C$. Pulse signal $S_M$ and output signal $S_Z$ from counter 27 are supplied to respective inputs of a two-input AND gate 29 which, in turn, produces a signal $S_A$, shown in FIG. 3E, indicating the time when the reading position of the optical pick-up device is located exactly on the desired record track after the braking operation has ended. Signal $S_A$ is supplied to control signal generating circuit 22 which, in response thereto, changes switch control signal $S_T$ from its low or logic "0" level to its high or logic "1" level, as shown in FIG. 3J. As a result, switch 12 is turned ON so that tracking error signal $S_E$ from tracking error signal generating circuit 11 is again supplied through resistor 13 and drive circuit 14 to tracking control device 15 to perform a tracking servo control operation.

In this manner, the optical pick-up device is controlled to accurately trace each record track on the disc.

It is to be appreciated that, in accordance with the present invention, the period or duration of drive pulse signal $S_{DD}$ is determined in accordance with the number of record tracks which are to be traversed by the optical pick-up device, that is, with the number $N_B$ preset into counter 26 by system control circuit 21, where the number of tracks to be traversed is counted by counter 26 in response to rectangular pulse signal $S_C$. In like manner, the period or duration of brake pulse signal $S_{BB}$ is determined in accordance with the linear speed of the optical pick-up device across the record tracks in the radial direction of the disc and, more particularly, is terminated when the speed of movement of the optical pick-up device is reduced to a speed lower than a predetermined speed, determined by the predetermined number $N_C$ preset into counter 27 by system control circuit 21. More particularly, counter 27 detects or counts the predetermined number $N_C$ in response to the duration of each pulse of rectangular pulse signal $S_C$, the duration or width of which corresponds to the speed of movement of the optical pick-up device. Since the drive pulse signal $S_{DD}$ and brake pulse signal $S_{BB}$ which form track jump signal $S_{JJ}$ are determined in response to rectangular pulse signal $S_C$, the correct number of tracks are traversed, regardless of eccentricity of the record disc, temperature variations and the like. As a result, the optical pick-up device is accurately moved to the desired track location on the record disc without any overshoot or undershoot. If necessary, a number of successive track jump signals may be used to perform a number of track jump operations for moving the optical pick-up device to a desired position on the record disc. For example, this may occur where $N-1$ can only be equal to 10 or 100.

It is to be appreciated that various modifications can be made with the present invention. For example, although duration of drive pulse signal $S_{DD}$ and the beginning of brake pulse signal $S_{BB}$ are determined by counter 26 which counts $N_B$ pulses of rectangular pulse signal $S_C$, with the number $N_B$ being set in response to the number $N-1$ of record tracks to be traversed by the optical pick-up device, other suitable methods for determining the duration of drive pulse signal $S_{DD}$ and beginning of brake pulse signal $S_{BB}$ can be used. For example, it is also possible to set a predetermined time period starting from time $t_0$, in response to the number $N-1$ of record tracks to be traversed by the optical pick-up device. It is to be appreciated, therefore, that the time at which drive pulse signal $S_{DD}$ is terminated and brake pulse signal $S_{BB}$ is commenced need not be set with such exactness. This is because the brake signal is terminated when the speed of movement of the optical pick-up device falls below a predetermined speed, determined in response to tracking error signal $S_E$, that is, rectangular pulse signal $S_C$.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

We claim:

1. A device for rapidly moving pick-up means of an information signal reproducing apparatus to a desired position with respect to a record disc having at least one record track with an information signal recorded therein, comprising:

drive means for moving said pick-up means in a direction transverse to said at least one record track; and track jump means for producing a track jump signal comprised of a drive signal of a first duration followed by a brake signal of a second duration and for supplying said track jump signal to said drive means to control the latter to rapidly move said pick-up means in said transverse direction to said desired position, said track jumps means including speed detector means for detecting the speed of movement of said pick-up means relative to said disc during said second duration and timing means for determining the length of said second duration by terminating said brake signal in accordance with the detected speed of movement.

2. A device according to claim 1, further comprising tracking error means for producing a tracking error signal corresponding to a deviation of said pick-up means with respect to each said record track, and wherein said speed detector means detects said speed in response to said tracking error signal.

3. A device according to claim 2, wherein said timing means terminates said brake signal when said detected speed is less than a predetermined value.

4. A device according to claim 2, wherein said tracking error means produces said tracking error signal as a width modulated signal with cycles having widths proportional to the speed of said pick-up means relative to said disc, and wherein said speed detector means detects said speed by comparing the width of a portion of each cycle of said tracking error signal with a predetermined width.

5. A device according to claim 4, wherein said portion is a full cycle of said tracking error signal.

6. A device according to claim 4, wherein said portion is a half cycle of said tracking error signal.

7. A device according to claim 4, wherein said timing means terminates said brake signal when the width of said portion of a cycle is greater than said predetermined width.

8. A device according to claim 4, wherein said timing means includes clock pulse generating means and counter means for counting the number of said clock pulses during each of said cycles, said timing means producing an output signal for terminating said brake signal when a counted value of said counter means exceeds a predetermined value.

9. A device according to claim 2, further comprising switch means for normally supplying said tracking error signal to said drive means and for supplying said track jump signal in place of said tracking error signal during said durations of said drive signal and said brake signal.

10. A device according to claim 1, wherein said timing means terminates said brake signal when said detected speed is less than a predetermined value.

11. A device according to claim 1, further comprising counter means for counting the number of said record tracks traversed by said pick-up means as it is moved in said transverse direction during the first duration, wherein the length of said first duration is determined in accordance with a counted value of said counter means.

* * * * *